Oct. 12, 1948.    P. M. D'AMICO    2,450,883
STUFFING TUBE
Filed Aug. 13, 1946
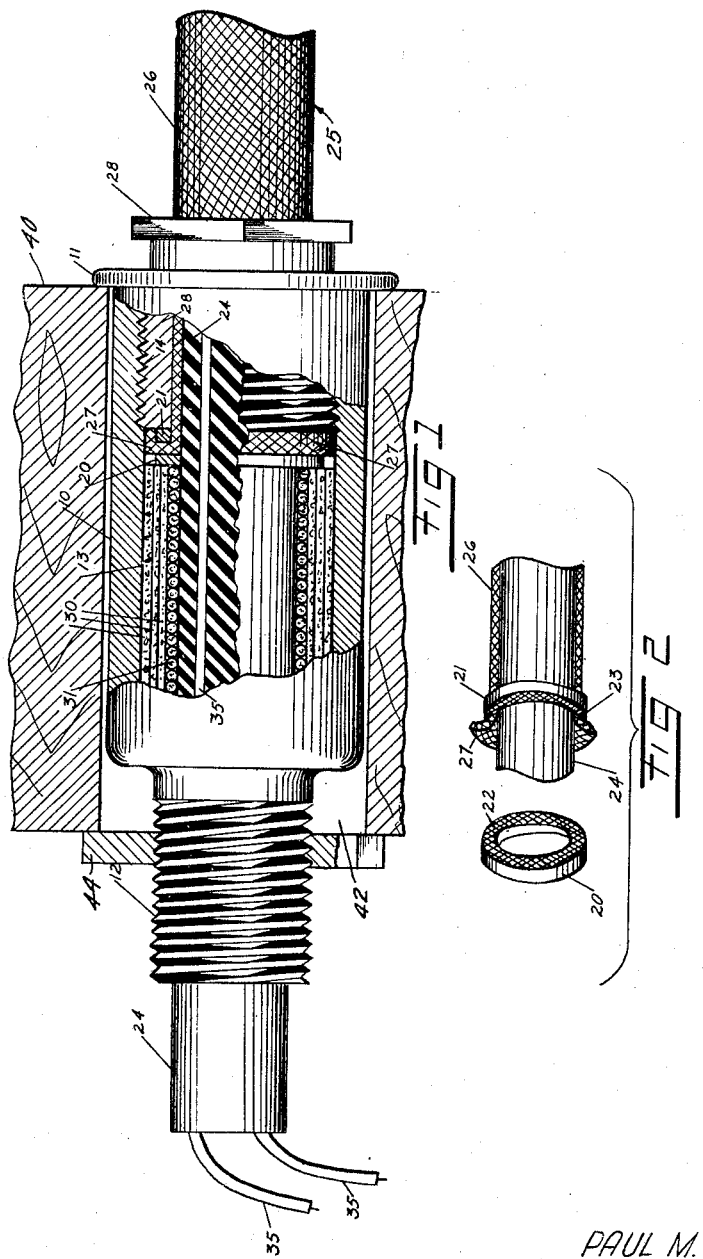
INVENTOR.
PAUL M. D'AMICO
BY M. A. Hayes
ATTORNEY Patented Oct. 12, 1948

2,450,883

UNITED STATES PATENT OFFICE 2,450,883

STUFFING TUBE

Paul M. D'Amico, Philadelphia, Pa.

Application August 13, 1946, Serial No. 690,198

3 Claims. (Cl. 285—72)

(Granted under the act of March 3, 1883, as amended April 30, 1928; 370 O. G. 757)

This invention relates to a stuffing tube for passing an electrical cable through a wall.

An object of this invention is to provide a stuffing tube for passing a cable through a wall, which stuffing tube is simple in construction and easily assembled and which will firmly secure the cable armor against slippage.

Further objects and advantages of this invention, as well as its construction, arrangement and operation, will be apparent from the following description and claims in connection with the accompanying drawing, in which, Fig. 1 is a view in side elevation of the stuffing tube, portions being in vertical cross section and portions being omitted for clarity of illustration, and Fig. 2 is a fragmentary, exploded view of the rings, a portion of the armor being cut away for clarity.

A preferred embodiment of the invention is illustrated in Fig. 1 wherein the reference numeral 10 denotes a cylindrical tube having at one end a flange 11, and at the other end a reduced portion 12 externally threaded. The flange 11 is used to abut one side of a wall or other partition 40, having an aperture 42 through which the cable is to pass while a nut 44 engages the reduced portion 12 and abuts the other side of the wall, thereby holding the tube securely in place. Within the tube 10 is an axial bore 13 internally threaded at one end as indicated at 14. An axial bore (not illustrated) also extends through the reduced portion 12.

Within the bore 13 there are two rings 20 and 21, which rings are knurled on their inner or adjacent faces as indicated by the numerals 22 and 23 (Fig. 2), the inner diameter of the ring 20 being large enough to accommodate the rubber insulation 24 of a cable 25 (having the usual leads 35) while the inner diameter of the ring 21 is slightly larger and is capable of accommodating the armor 26 of the cable 21. The ring 21 serves as a clamping ring for the free end 27 of armor 26, the free end 27 being outwardly flared, folded back and curled about the ring 21. A gland nut 28 engages the threaded portion 14 of the tube 10 and serves to force the ring 21 against the ring 20, thereby clamping free end 27 of armor 26 securely in place.

Soft packing 30 and hard packing 31 fill the space between the rubber insulation 24 and the interior of the tube 10.

Various modifications and changes can be made in the above-described apparatus without departing from the spirit and scope thereof as set forth in the appended claims.

The invention described herein may be manufactured and used by or for the Government of the United States of America for governmental purposes without the payment of any royalties thereon or therefor.

What is claimed is:

1. A stuffing tube comprising a cylindrical tube having a bore extending axially of said tube and adapted to receive a cable therein, said cable having an insulation covering and an armor sheath surrounding said insulation covering, an integral cylindrical extension of reduced diameter coaxial with and extending beyond said tube and having a bore of smaller diameter than the said bore of said tube, a flange on said tube at the end opposite to said extension, said bore of said tube being threaded at said opposite end, a first ring slideable on the insulation covering of said cable in said tube bore, a second ring slideable on the armor sheath of said cable and adjacent said first ring, the inner diameter of said first ring being smaller than the inner diameter of said second ring, the portion of the armor between said first and second rings being outwardly flared and folded back over said second ring, a gland nut threadedly engaged with the threaded portion of said tube bore, and packing material substantially filling the space within said tube bore between the reduced diameter extension and said first ring, whereby, on tightening of said gland nut, said first and second rings are pressed together clamping the armor sheath therebetween.

2. The stuffing tube defined in claim 1, wherein said tube is adapted for mounting in an aperture formed in a wall member, said flange being disposable adjacent the aperture at one side of the wall member, and means on the reduced diameter extension of said tube and abutting the other side of said wall member for securing said tube in the aperture.

3. In combination, a stuffing tube having a cylindrical body portion, a threaded extension on one end of said body portion, and aligned axial bores in said body portion and said extension, said extension bore being of smaller diameter than said body portion bore, the end of said body portion bore opposite said extension being threaded; an electric cable extending through said tube and having an insulation covering surrounding the conductors thereof and a flexible metallic sheath surrounding said insulation covering; said sheath being adapted to be stripped back over a portion of its length baring said insulation covering; a first ring in said tube bore and slidably carried on said insulation covering; a second ring in said tube bore adjacent said first ring and slidably carried on said sheath, the adjacent faces of said rings being knurled and adapted to receive and grip said stripped back portion of the sheath therebetween; stuffing material substantially filling the space within said body portion bore between said extension and said first ring; and a gland nut in engagement with the threaded portion of said body portion bore for urging said first and said second rings together.

PAUL M. D'AMICO.

REFERENCES CITED

The following references are of record in the file of this patent:

UNITED STATES PATENTS

| Number | Name | Date |
|---|---|---|
| 982,006 | Kayser | Jan. 17, 1911 |
| 2,177,508 | Abbott | Oct. 24, 1939 |